May 19, 1936. E. S. GEORGE ET AL 2,041,126
POWER LAWN MOWER
Filed Feb. 28, 1935 4 Sheets-Sheet 2
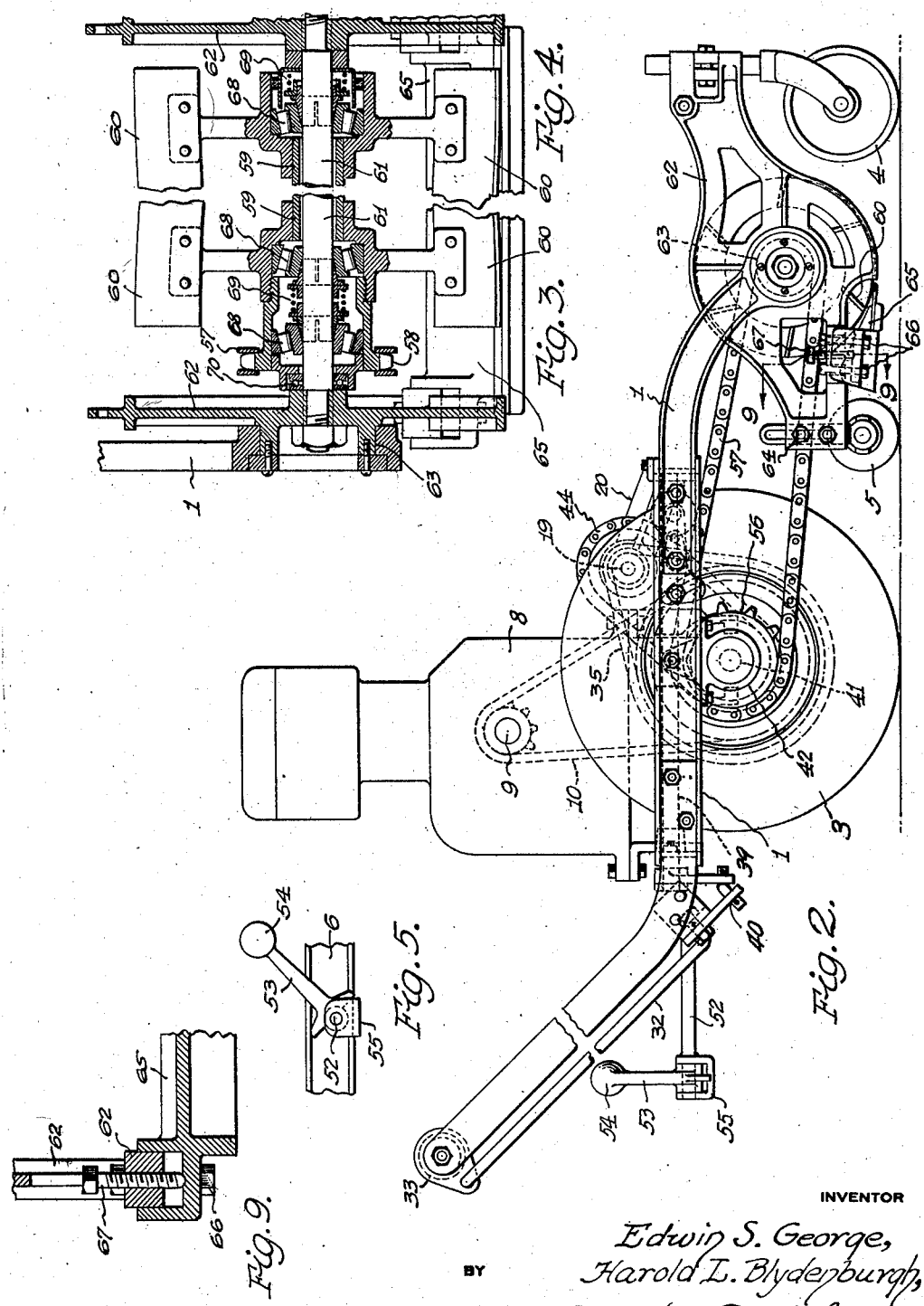
INVENTOR
Edwin S. George,
Harold L. Blydenburgh,
BY
ATTORNEYS May 19, 1936. E. S. GEORGE ET AL 2,041,126
POWER LAWN MOWER
Filed Feb. 28, 1935 4 Sheets-Sheet 3
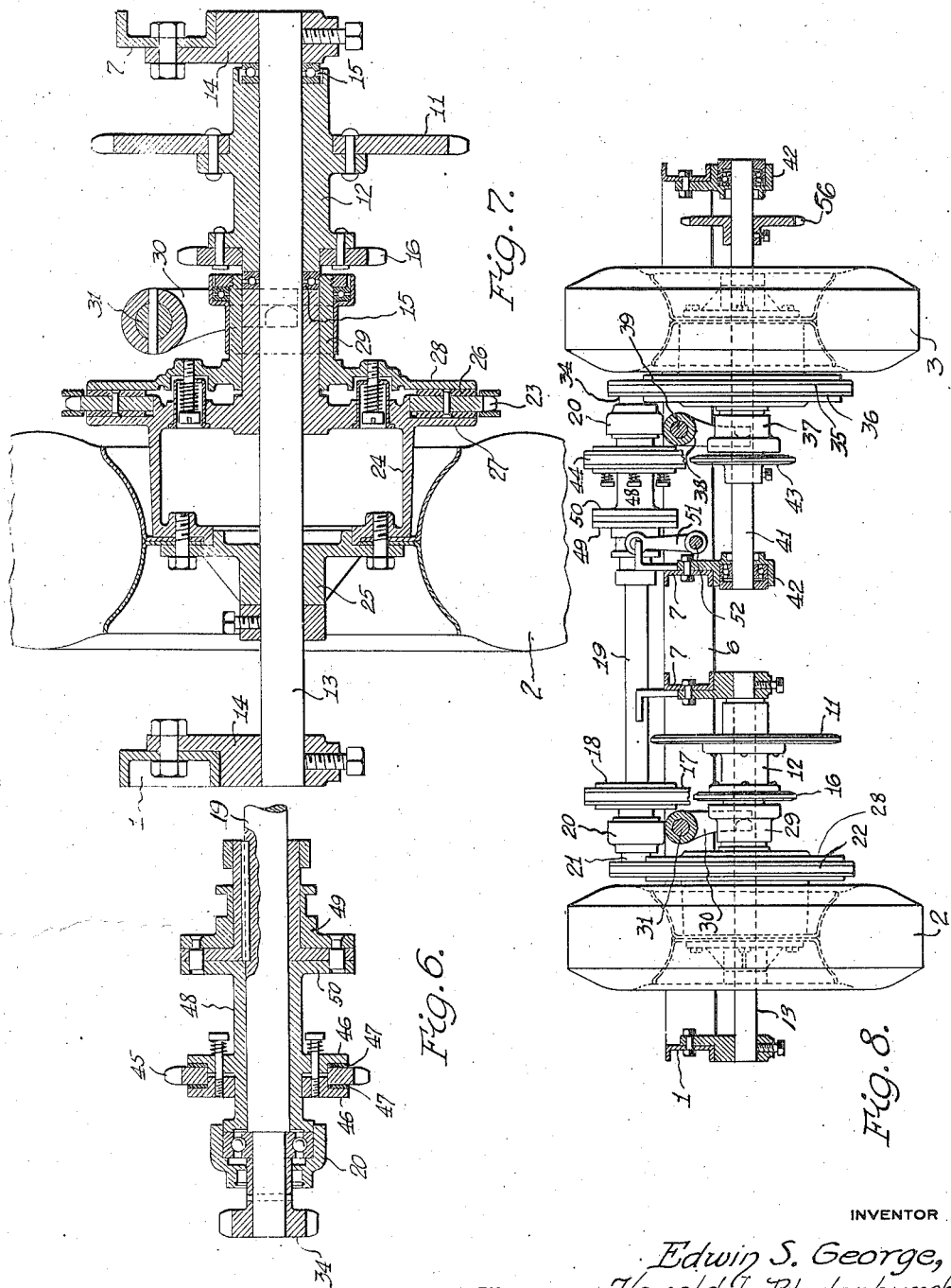
INVENTOR
Edwin S. George,
Harold L. Blydenburgh,
BY
ATTORNEYS

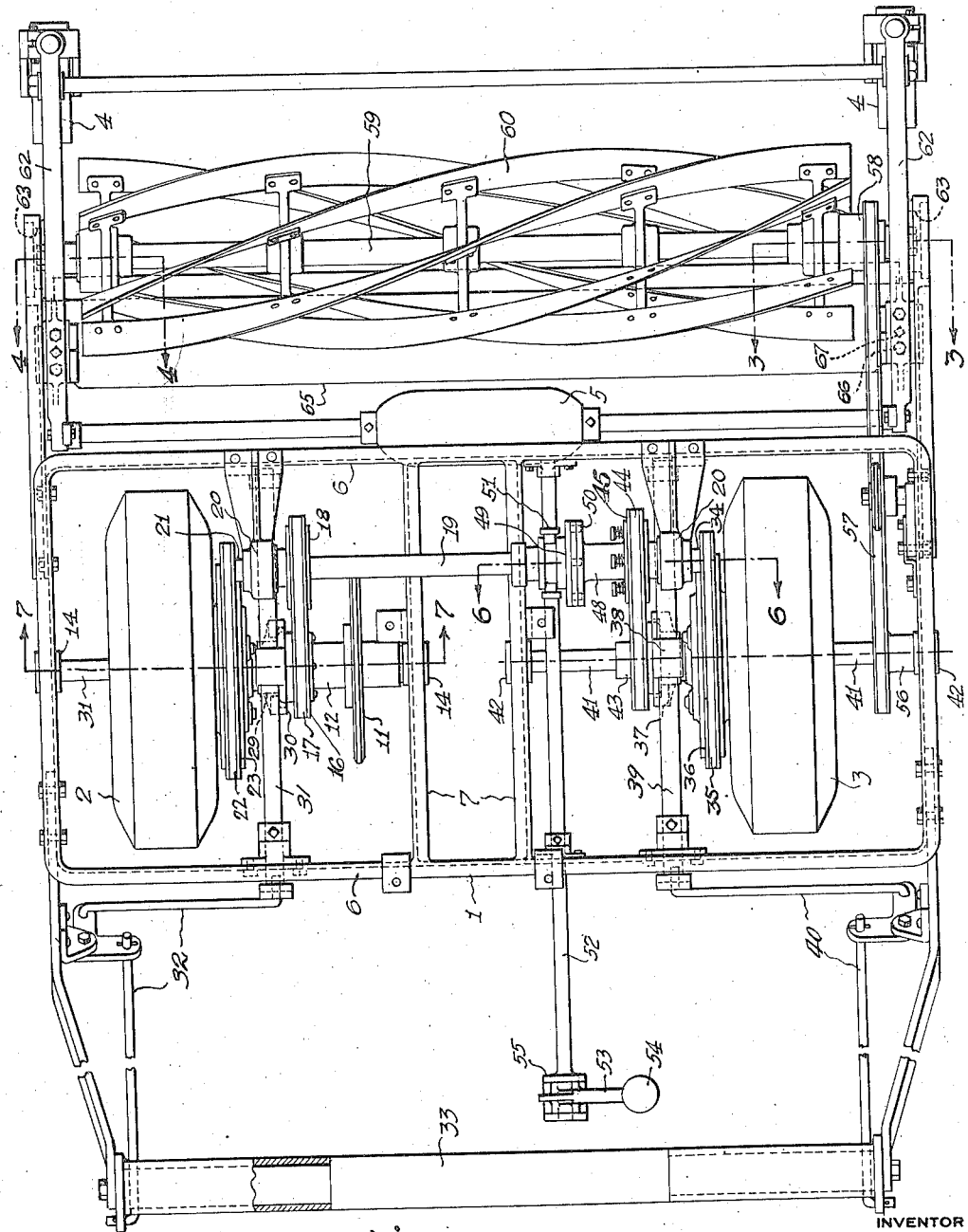

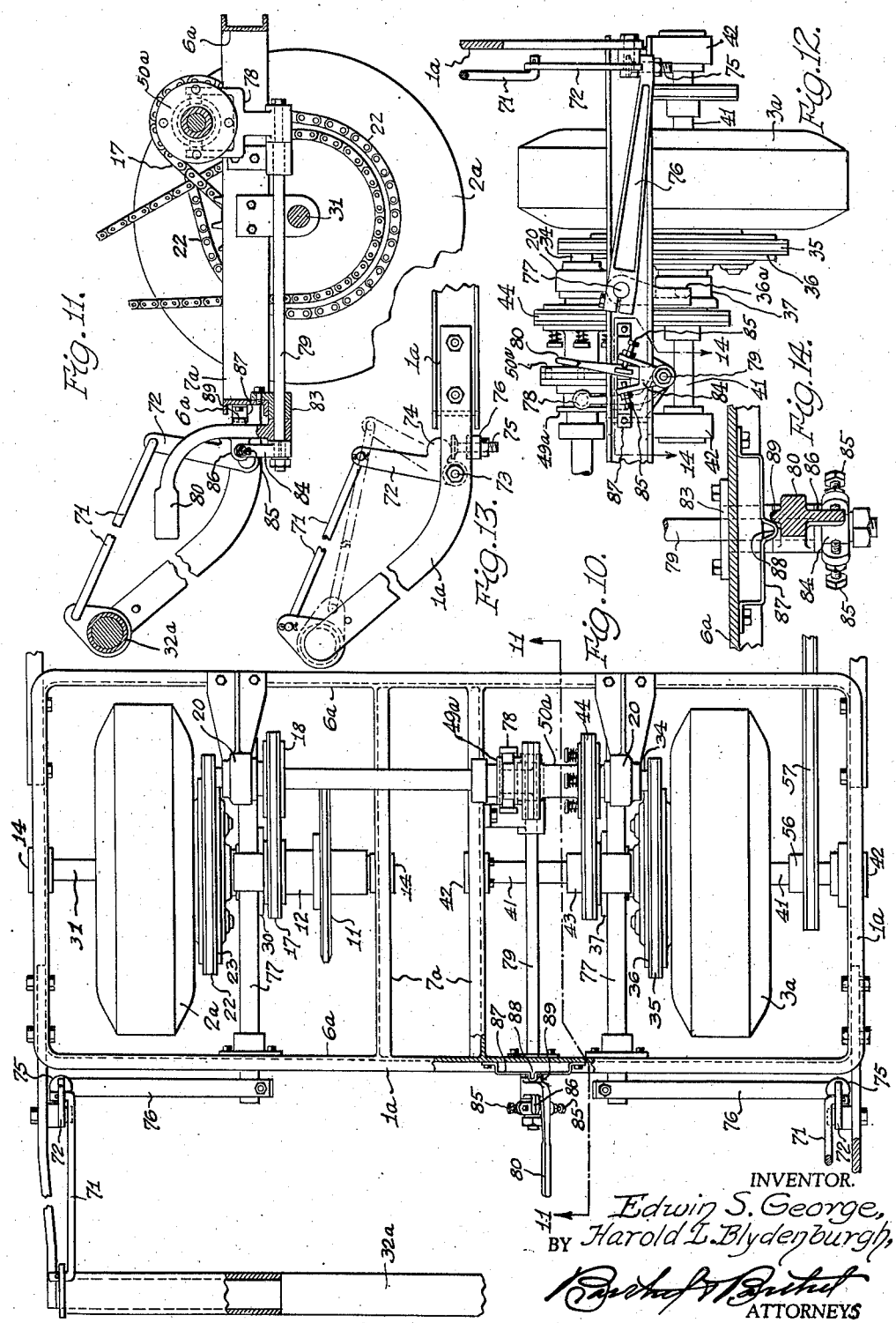

Patented May 19, 1936

2,041,126

UNITED STATES PATENT OFFICE 2,041,126

POWER LAWN MOWER

Edwin S. George, Bloomfield Hills, and Harold L. Blydenburgh, Highland Park, Mich., assignors to The Moto-Mower Company, Detroit, Mich., a corporation of Michigan Application February 28, 1935, Serial No. 8,638

12 Claims. (Cl. 56—26)

This invention relates to power lawn mowers and has for its object to provide a machine of this type which will have greater facility of handling and smoother operation.

An important object is to provide an improved wheel and reel driving means.

Another object is to provide an improved reel and reel supporting means.

A further object is to provide an improved cutter blade arrangement whereby weeds and tall grass will be prevented from becoming entangled with the reel hub and bearings.

Another object is to provide an improved control mechanism for ready manipulation and control of the source of power, the steering, and the operation of the reel.

Other objects and advantages when directly described or indirectly implied from the favorable arrangement of parts will become hereinafter more fully apparent as reference is had to the accompanying drawings wherein our invention is illustrated by way of example, and in which:

Figure 1 is a top plan view of our improved mower with the power plant removed;

Fig. 2 is a side elevation of the mower;

Figs. 3 and 4 are vertical sections through the reel bearings taken along the lines 3—3 and 4—4 respectively of Fig. 1;

Fig. 5 is an end elevation of the cutter control;

Fig. 6 is a detail section taken along the line 6—6 of Fig. 1;

Fig. 7 is a section taken along the line 7—7 of Fig. 1;

Fig. 8 is a rear elevation of the main wheel assemblies with the bearings and frame supports shown in section;

Fig. 9 is a detail vertical section taken along the line 9—9 of Fig. 2;

Fig. 10 is a plan view of the main frame section with the power plant removed showing a modified form of controls;

Fig. 11 is a vertical section taken along the line 11—11 of Fig. 10;

Fig. 12 is a rear elevation of one of the drive wheel assemblies;

Fig. 13 is a side elevation of a portion of the frame and control cam, and

Fig. 14 is a sectional view taken along the line 14—14 of Fig. 12.

More particularly, 1 indicates the frame of the mower supported by two main wheels 2, 3, two swivelled caster wheels 4 and a roller 5. The frame includes transverse ribs 6 and rail bars 7 upon which a power plant 8 is supported. The power plant 8 has a drive shaft 9 in driving connection by a chain 10 with a gear 11 fixedly secured on a hollow shaft 12 which is rotatably mounted about a fixed axle 13. The axle 13 is secured to and supported at each end in the frame brackets 14 which depend from the frame 1, 7.

The hollow shaft 12 has thrust bearings 15 at each end thereof, and a second sprocket wheel 16 fixedly secured therearound. The wheel 16 has a driving connection 17 with a sprocket wheel 18 fixedly mounted on a layshaft 19 supported by the bearings 20. At the left end (Fig. 8) of the layshaft is a sprocket wheel 21 having a driving connection 22 with a sprocket wheel 23 rotatably mounted on a hub element 24, which element is in fixed engagement with the hub 25 of the wheel 2. The sprocket 23 has friction plates 26 at each side thereof for clutching engagement with the plates 27 and 28, one of which, 27 is integral with the hub element 24 and the other of which 28 is integral with a collar 29 slidable on the hub element 24 under actuation by a rocker arm 30.

It will thus be seen that power is transmitted from the power plant 8 through the sprockets 11, 16, 18, 23 and thence to the wheel 2 through the clutch 27, 28, 29 under the influence of a rocker arm 30. The rocker arm is manually controllable or rockable by the shaft 31 through a linkage 32 to the handle 33.

The right end (Fig. 8) of the layshaft 19 carries a fixed sprocket wheel 34 having driving connection 35 with a sprocket wheel 36 exactly similar to the sprocket 23 and similarly actuated into clutching and declutching position by a collar 37 in operative engagement with a rocker arm 38 on a rock shaft 39 which is connected by a linkage 40 to the handle 33. The sprocket 36 and clutch collar 37 are rotatable with respect to the axle 41 upon which they are mounted. The axle 41 differs from the axle 13 in that it is rotatably mounted at its ends in the bearings 42. The operation of the wheel 3 is, however, the same as for the wheel 2, the layshaft 19 driving the wheel through the sprocket 34 and the sprocket 36 subject to the clutch 37.

Keyed on the axle 41 is a sprocket 43 having driving connection 44 with a sprocket 45 which has friction elements 46 for spring pressed engagement with plates 47 carried by a collar 48. Keyed to the layshaft 19 is a clutch element 49 adapted for engagement with a clutch element 50 integral with the collar 48. A rocker arm 51 for actuating this clutch is keyed on the rock shaft 52 which extends to a handle 53 convenient to the handle 33. On the end of the handle is a weight 54. A bracket 55 integral with the shaft 52 provides stops or rests for the two extreme positions of the handle, as shown in Fig. 5.

Thus the shaft 41 has a rotation independent of the rotation of the wheel 3 thereon and this shaft drives a sprocket which resides outwardly of the wheel 3. In driving engagement 57 with the sprocket 56 is a further sprocket 58 (Fig. 3) which is integrally connected to the reel shaft 59 carrying the cutter blades 60.

It will be understood from the foregoing that either wheel 2, 3 may be disconnected from and connected with the power plant 8 without regard to the other whereby steering is facilitated. The reel 60 can be connected with and disconnected from the power plant 8 without regard to operation or inoperation of the wheels 2, 3 and in case an obstruction such as a stick or other article interferes with the rotation of the reel, the frictionally held sprocket 45 will provide slippage until the handle 53, 54 can be thrown to inoperative position.

The reel shaft 59 is hollow and rotatable on a reel axle 61 which is fixedly mounted in a forward frame portion 62 journaled at 63 in the frame side rails 1. This frame portion 62 carries the front wheels 4 forwardly of the journal 63 and the roller 5 rearwardly of the journal, the roller 5 being vertically adjustable at 64. The cutter bar 65 is also supported from the frame portion 62 by bolts 66 and vertically adjustable at each end by the screws 67 as shown in Fig. 9. It will be noted particularly in Figs. 3 and 4 that the cutter bar extends outwardly at least to a point directly beneath the frame 62. The reason for this is to prevent weeds and tall grass from becoming wound around the hub of the reel 59, 60.

The reel shaft 59 has clearance with the axle 61 and is fixedly secured to the hub of the cutter reel, being in effect an enlargement of the reel shaft at each end, as seen in Figs. 3 and 4, to receive anti-friction bearings 68, preferably of the inclined roller type having a spring 69 constituting a slack take up means. A thrust bearing 70 relieves friction between the frame support 62 and the reel shaft 59.

In Figs. 10 to 14 is shown a modified form of control. The frame 1a having cross members 6a and connecting members 7a, and also the wheels 2a and 3a with their axle assemblies are the same as previously described. The handle 32a has pivotally connected thereto at each end the links 71 which are identical in operation and only one will be referred to. The other end of the link 71 is pivotally connected to a rocker arm 72 pivotally supported at 73 on the frame side rail. The arm 72 has a cam surface 74 for depression of an adjustable pin 75 in a lever 76. Rocking of the lever 76 rotates the shaft 77 which rocks the clutch finger 36a.

The cutter bar clutch 49a, 50a is actuated by a clutch finger 78 mounted on the shaft 79 to rock therewith under the influence of a handle 80. That part of the shaft 79 adjacent the handle is rockably supported in a bracket 83 and outwardly of the handle 80 is a fixture 84 fixedly mounted on the shaft 79 and having adjustable abutments 85 for contact by an extension or lug 86 on the handle 80. Mounted on the frame cross member 6a is a spring 87 bent at its midpoint 88 into the path of a lug 89 integral with the handle 80. The handle 80 is freely mounted on the shaft 79 so that when it is actuated to the left from the position shown in Fig. 14, the shaft 79 does not respond until the lug 89 has overpassed the peak of the bend 88 and is thereafter actuated in a snap action by the spring 87 which forces the lug 86 against an abutment 85 whereupon the shaft 79 is rotated by the action of the spring. This gives a rapid action to the shaft through its small angle of rotation to an extreme position.

What we claim is:

1. In a cutter reel assembly, a hollow reel shaft enlarged at its ends, a fixed axle of substantially smaller diameter than the inside diameter of said reel shaft extending axially through said reel shaft, and anti-friction bearings in each of said enlarged ends supporting said reel shaft for rotation on said axle.

2. In a cutter reel assembly, a hollow reel shaft enlarged at each end thereof, a fixed axle extending axially through said reel shaft, anti-friction bearings housed by each of said enlarged ends, and a driving gear means supported by one of said enlarged ends.

3. In a cutter reel assembly, a hollow reel shaft enlarged at each end thereof, a fixed axle extending through said reel shaft, anti-friction bearings in each of said enlarged ends, a cup shaped closure member around said axle secured to one of said enlarged ends, an anti-friction bearing within said closure member, and a sprocket wheel integral with said closure member.

4. In a cutter reel assembly, a fixed axle, a reel shaft rotatably mounted on said axle, a gear member secured on said reel shaft at one end, and a reel shaft thrust bearing encircling said axle at that end.

5. In a cutter reel assembly, a hollow reel shaft enlarged at its ends, a fixed axle extending through said reel shaft, anti-friction bearings in each of said enlarged ends, a closure member for one of said enlarged ends having a gear member integral with the outer surface thereof and an anti-friction bearing internally thereof, and a thrust bearing encircling said axle and abutting said closure member.

6. In a lawn mower wherein a power plant is connected in driving relation with a cutter reel through a clutch device, control means for actuating the clutch device comprising a clutch finger keyed on a rockshaft, a hand lever freely rotatable on said rockshaft having a lateral extension on each side thereof extending longitudinally of said rockshaft, spaced abutments on each side of one of said extensions fixed on said rockshaft, and a fixedly anchored snap spring means in the path of the other of said extensions for imparting a snap action in engaging and disengaging said reel clutch.

7. In a lawn mower wherein a power plant is connected in driving relation with a cutter reel through a clutch device operable into engaging and disengaging position in response to a relatively small actuating movement, an actuating means for the clutch device comprising a clutch finger, a manually operable lever and a snap spring device comprising a bent spring mounted on the frame of the mower and extending into the path of said lever for rapidly moving said clutch finger to a position of maximum travel in response to movement of said lever.

8. In a lawn mower wherein a power plant is connected in driving relation with main wheels through individual clutch devices, means for actuating the devices comprising a manually rotatable handle, a link at each end of said handle pivotally connected thereto at one end, arms rotatable about a fixed pivot each pivotally connected at their outer ends to one of said links, said arms each having a cam face, two rockshafts, levers keyed at one end to each rockshaft and subject at their other end to actuation by said cam surfaces to rotate said rockshafts, and a clutch finger keyed on the end of each of said rockshafts for actuation of said clutch devices.

9. In a power mower, a frame comprising side rails and cross members, a power plant supported on said cross members centrally of said frame, main driving wheels below and laterally of said power plant within the vertical confines of said frame, individual driving means connecting said wheels with said power plant for independent operation thereof, and a cutter reel supported at each end from said frame, said cutter reel having a greater length than the gauge of said wheels whereby said wheels traverse a course first completely traversed by said reel.

10. In a power mower, a main frame comprising side rails and cross members, a power plant supported centrally of said frame, main wheels below and laterally of said power plant within the vertical confines of said frame, means individual to each of said main wheels for driving said wheels each independently from said power plant, a secondary frame pivotally mounted on said main frame forwardly of said wheels, a cutter reel supported jointly by said frames at the pivotal point thereof, caster wheels forwardly of said cutter reel supporting the front end of said secondary frame, and a roller rearwardly of said reel for supporting the rear end of said second frame.

11. In a power mower, a main frame comprising side rails and cross members, a power plant supported centrally of said frame, main wheels below and laterally of said power plant within the vertical confines of said frame, means individual to each of said main wheels for driving said wheels each independently from said power plant, a secondary frame pivotally mounted on said main frame forwardly of said wheels, a cutter reel supported jointly by said frames at the pivotal point thereof, caster wheels forwardly of said cutter reel supporting the front end of said secondary frame, and a roller rearwardly of said reel for supporting the rear end of said second frame, the journals for said reel being internally of the pivotal points of said secondary frame on said main frame.

12. In a power mower, a main frame comprising side rails and cross members, a power plant supported by said frame centrally thereof, main wheels below and laterally of said power plant within the vertical confines of said frame, means for driving each of said wheels independently from said power plant, a secondary frame having the midpoint of its side rails journaled in the front ends of said side rails, wheel means supporting each end of the side rails of said secondary frame, a fixed shaft connecting the side rails of said secondary frame, and a cutter reel journaled on said fixed shaft, with the journals thereof being inwardly of the side rails of both of said frames, said reel having greater length than the gauge of said main wheels, and means located within the vertical confines of both of said frames for driving said reel from said power plant.

EDWIN S. GEORGE.
HAROLD L. BLYDENBURGH.